United States Patent [19]
Marshall et al.

[11] Patent Number: 5,691,780
[45] Date of Patent: Nov. 25, 1997

[54] PHASE ERROR CONTROL FOR COLOR WHEEL

[75] Inventors: Stephen W. Marshall, Richardson; Donald Hicks, Lewisville; William R. Breithaupt, Dallas, all of Tex.

[73] Assignee: Texas Instruments Incorporated, Dallas, Tex.

[21] Appl. No.: 489,971

[22] Filed: Jun. 13, 1995

[51] Int. Cl.⁶ .............................. H04N 9/12; H04N 9/475
[52] U.S. Cl. .................. 348/743; 348/514; 348/524; 348/537
[58] Field of Search .................... 348/70, 266, 267, 348/268–271, 742, 743, 503, 513–514, 524, 536–537, 551; H04N 9/04, 9/47, 9/12, 9/475, 5/06, 9/455, 5/04

[56] References Cited

U.S. PATENT DOCUMENTS

| | | |
|---|---|---|
| 2,645,678 | 7/1953 | Christensen ...................... 348/743 |
| 5,079,544 | 1/1992 | Demond . |
| 5,138,454 | 8/1992 | Parulski ...................... 348/581 |
| 5,365,283 | 11/1994 | Doherty et al. ............... 348/743 |
| 5,367,337 | 11/1994 | Pyle et al. ................... 348/537 |
| 5,448,314 | 9/1995 | Heimbuch . |
| 5,452,024 | 9/1995 | Sampsell . |
| 5,526,051 | 6/1996 | Gove . |

*Primary Examiner*—John K. Peng
*Assistant Examiner*—Sherrie Hsia
*Attorney, Agent, or Firm*—Julie L. Reed; James C. Kesterson; Richard L. Donaldson

[57] ABSTRACT

A motor control unit (15c) for synchronizing a color wheel (15) to an incoming video signal and for re-synchronizing the color wheel after a channel change. The motor control unit (15c) has an error control unit (31), which detects an out-of-phase condition, and derives a color wheel sync signal from the pixel sample clock adjusted by any phase error. A drive unit (33) phase locks this sync signal to an index signal provided by the color wheel. The result is a tightly controlled re-synchronization that minimizes perceived effects.

11 Claims, 2 Drawing Sheets

PHASE ERROR CONTROL FOR COLOR WHEEL

TECHNICAL FIELD OF THE INVENTION

This invention relates to image display systems, and more particularly to digital image display systems that use a color wheel.

BACKGROUND OF THE INVENTION

Image display systems based on spatial light modulators (SLMs) are an alternative to image display systems based on cathode ray tubes (CRTs). SLM systems provide high resolution without the bulk of CRT systems.

Digital micro-mirror devices (DMDs) are one type of SLM, and may be used for either direct view or for projection displays. A DMD has an array of hundreds or thousands of tiny tilting mirrors, each of which provides light for one pixel of an image. To permit the mirrors to tilt, each mirror is attached to one or more hinges mounted on support posts, and spaced by means of a fluidic (air or liquid) gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the entrance pupil of a projection lens and then to an image plane.

One approach to providing color images in an SLM display system is referred to as "sequential color". All pixels of a frame of the image are sequentially addressed with different colors. For example, each pixel might have a red, a green, and a blue value. Then, during each frame period, the pixels of that frame are addressed with their red, green, then blue data, alternatingly. A color wheel having segments of these same colors is synchronized with the data so that as the data for each color is displayed by the SLM, the light incident on the SLM is filtered by the color wheel. For standard display rates, the eye perceives the image as having the proper color.

In many color wheel display systems, the vertical synchronization ("vertical sync") signal of the incoming video signal is used to drive the color wheel. When a channel change occurs, the vertical sync signal will have a new phase with respect to the color wheel. The synchronization problem becomes one of synchronizing the incoming signal, the color wheel, and the displayed data.

U.S. Pat. No. 5,365,283, entitled "Color Phase Control for Projection Display Using Spatial Light Modulator", assigned to Texas Instruments, describes one method of synchronizing the incoming signal and the color wheel. Essentially, the method involves driving the color wheel with a signal derived from the horizontal sync signal rather than from the vertical sync signal.

SUMMARY OF THE INVENTION

One aspect of the invention is a method of synchronizing a color wheel to an incoming video signal. The method may be used for any type of incoming video signal, with certain parameters being varied for interlaced versus non-interlaced signals and for signals have different line resolutions and frame rates. The method assumes a color wheel display system with a pixel sample clock, a vertical sync signal, and an index signal provided by the color wheel to indicate its phase and speed. It provides a color wheel sync signal that determines the speed of the color wheel by phase locking the index signal to the color wheel sync signal.

As an example of using the method for an interlaced signal, the pixel clock signal is divided by one-fourth the number of pixels per line, thereby providing a divided pixel clock signal. The index signal, or alternatively the color wheel sync signal, is compared to the vertical sync signal to determine whether the color wheel and the incoming video signal are in phase, thereby providing a phase error value. Then, the phase error value is added to the number of lines in two frames. This sum is used to further divide the divided pixel clock signal, thereby providing the color wheel sync signal.

An advantage of the invention is that it adds an outer control loop to control phase error resulting from a phase changing event, such as a channel change. The result is a tightly controlled motor speed, which minimizes visible artifacts during the phase change. Also, because the color wheel sync signal is derived from the pixel clock instead of the vertical sync signal, the transient time is reduced.

DETAILED DESCRIPTION OF THE INVENTION

Display System Overview

The following description is in terms of a display system that displays images generated by an SLM or other pixel array display device. The term "pixel array display device" is used in a broad sense to include any type of array that generates a display using individually addressed pixels. Thus, for example, the display device might be a liquid crystal array. However, the invention is not limited to such devices, and could be used with any display system that uses a color wheel for sequential color displays. For example, the data described herein could be converted to an analog signal for use by a white light CRT whose images are filtered by a color wheel.

Figure 1:
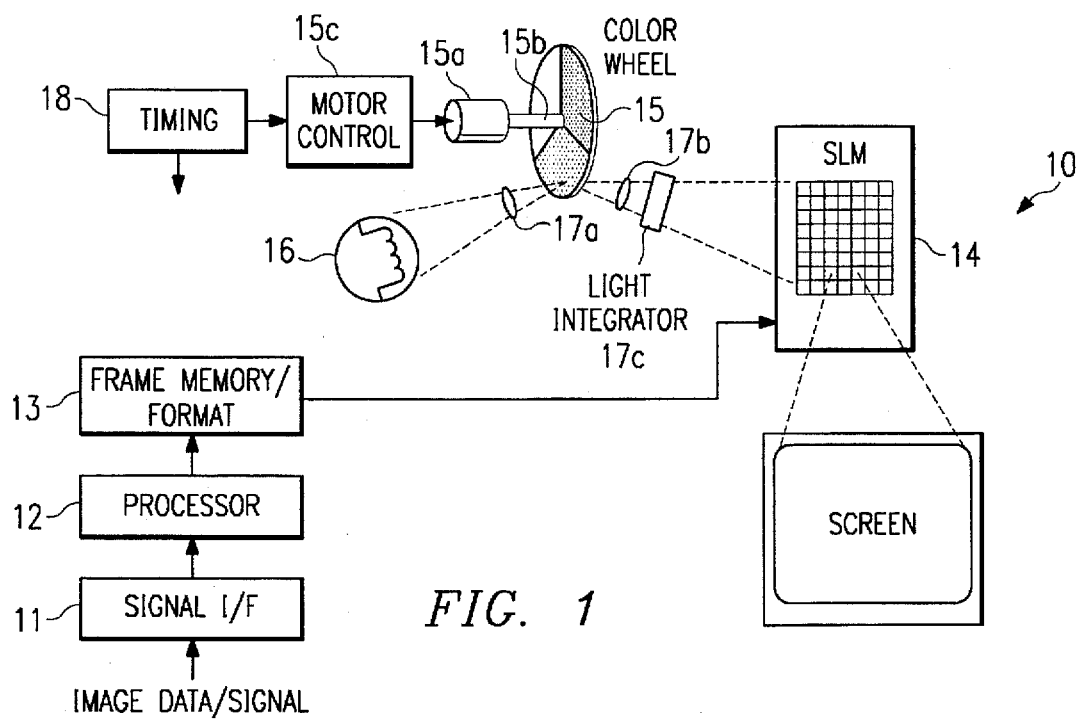
FIG. 1 is a block diagram of a display system having a color wheel motor control unit in accordance with the invention.

FIG. 1 is a block diagram of a typical SLM-based image display system 10 that uses a color wheel 15 in accordance with the invention. As explained below, the invention is directed to controlling color wheel 15 to reduce artifacts that might otherwise occur during events such as a channel change, which disrupt the phase of incoming video information.

The following overview of the various components of display system 10 provides details helpful to understanding of the invention. Further details pertaining to a DMD-based image display system with other types of color wheels are set out in U.S. Pat. No. 5,079,544, entitled "Standard Independent Digitized Video System"; In U.S. Pat. No. 5,526,051, entitled "Digital Television System"; and in U.S. Pat. No. 5,452,024, entitled "DMD Display System". Further details describing the general operation of color wheels for SLM-based display systems are set out in U.S. Pat. No. 5,233,385, entitled "White Light Enhanced Color Field Sequential Projection"; U.S. Pat. No. 5,448,314, entitled "Method and Apparatus for Sequential Color Imaging"; and U.S. patent application Ser. No. 08/339,373, entitled "Digital Motor Controller for Color Wheel". Each of these patents and patent applications is assigned to Texas Instruments incorporated, and each is incorporated herein by reference.

Signal interface 11 receives some kind of input signal. For purposes of example herein, it will be assumed that the input signal is a standard NTSC video signal having horizontal and vertical synchronization components. However, in other systems, the input signal might be graphics data already in digital form. The signal is "field sequential" in that the video information is arranged field-by-field, separated in accordance with the vertical sync signal.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Pixel data processor 12 prepares the data for display, by performing various processing tasks. Processor 12 includes processing memory for storing pixel data during processing. The tasks performed by processor 12 may include linearization, colorspace conversion, and proscan. Linearization removes the effect of gamma correction, which is performed on broadcast signals to compensate for the non-linear operation of CRT displays. Colorspace conversion converts the data to RGB data. Proscan converts interlaced fields of data into frames by generating new data to fill in odd or even lines. The order in which these tasks are performed may vary.

Display memory 13 receives processed pixel data from processor 12. Display memory 13 formats the data, on input or on output, into "bit-plane" format and delivers the bit-planes to SLM 14. The bit-plane format provides one bit at a time for each pixel of SLM 14 and permits each pixel to be turned on or off in accordance with the weight of that bit. For example, where each pixel is represented by n bits for each of three colors, there will be 3 n bit-planes per frame. Bit-planes containing less significant bits will result in shorter display times than the bit-planes containing more significant bits. A pixel value of 0 (black) results in the pixel being off for that color during the frame. For each color, each mirror element of the SLM 14 can be "on" for a duration of anywhere from 1 LSB period to $2^n-1$ LSB periods. In other words, each color has $2^n-1$ time slices, during which any pixel can be on for any number of time slices between 0 and $2^n-1$.

In a typical display system 10, memory 13 is a double-buffer memory, which means that it has a capacity for at least two display frames. The buffer for one display frame can be read out to SLM 14 while the buffer for another display frame is being written. The two buffers are controlled in a "ping-pong" manner so that data is continuously available to SLM 14.

SLM 14 may be any type of SLM. For purposes of example, this description is in terms of a display system whose SLM 14 is a digital micro-mirror device (DMD). However, as stated above, the same concepts apply to display systems that use other types of SLMs or other image generating devices.

Light incident on SLM 14 is provided by a light source 16 and is transmitted through a rotating color wheel 15. Lens 17a focusses the source illumination, in the form of a source beam, to a "spot size" at the plane of the color wheel 15. Lens 17b directs the light to SLM 14 via light integrator 17c.

In the example of FIG. 1, color wheel 15 has three filter segments, each of a different primary color. For purposes of example herein, these colors are red, green, and blue. In alternative embodiments, other colors could be used and fewer or more than three colors could be used. Also, there could be more than one segment for each color. The segments need not be exactly the same size, depending on the desired color balance.

As explained in the Background, the data for each color are sequenced and the display of the data is synchronized so that the portion of color wheel 15 through which light is being transmitted to SLM 14 corresponds to the data being displayed. In the example of this description, each pixel is represented by RGB data, which means that each pixel has a red value, a green value, and a blue value. As the values for each color of all pixels in a frame are being displayed, color wheel 15 rotates so that the light is transmitted through the corresponding red, blue or green filter. For each pixel, the combination of these three values is perceived as the desired color.

Color wheel 15 is attached to a shaft 15b, which is driven by motor 15a, causing color wheel 15 to rotate. A motor control unit 15c controls the speed and phase of color wheel 15. Where a frame of data is displayed for a frame period of T seconds, color wheel 15 has a period of revolution of T seconds. For example, the desired speed might be 60 revolutions per second to correspond to a 60 frame per second display rate.

When the color wheel 15 and the data being displayed are "in-phase", the proper filter (red, green, or blue) of color wheel 15 is transmitting light from SLM 14 as the data for that filter is being displayed. U.S. Pat. No. 5,365,283, entitled "Color Phase Control for Projection Display Using Spatial Light Modulator", assigned to Texas Instruments Incorporated and incorporated by reference herein, describes a method of using pointers to maintain the in-phase relationship between color wheel 15 and the displayed data. Master timing unit 18 provides various system control functions. One timing signal provided by master timing unit 18 is a signal defining the display times for each bit weight of the pixel value.

Although not illustrated in FIG. 1, system 10 also includes a projection lens and various other optical devices for collecting and projecting the image from SLM 14 to the image plane (screen).

Figure 2:
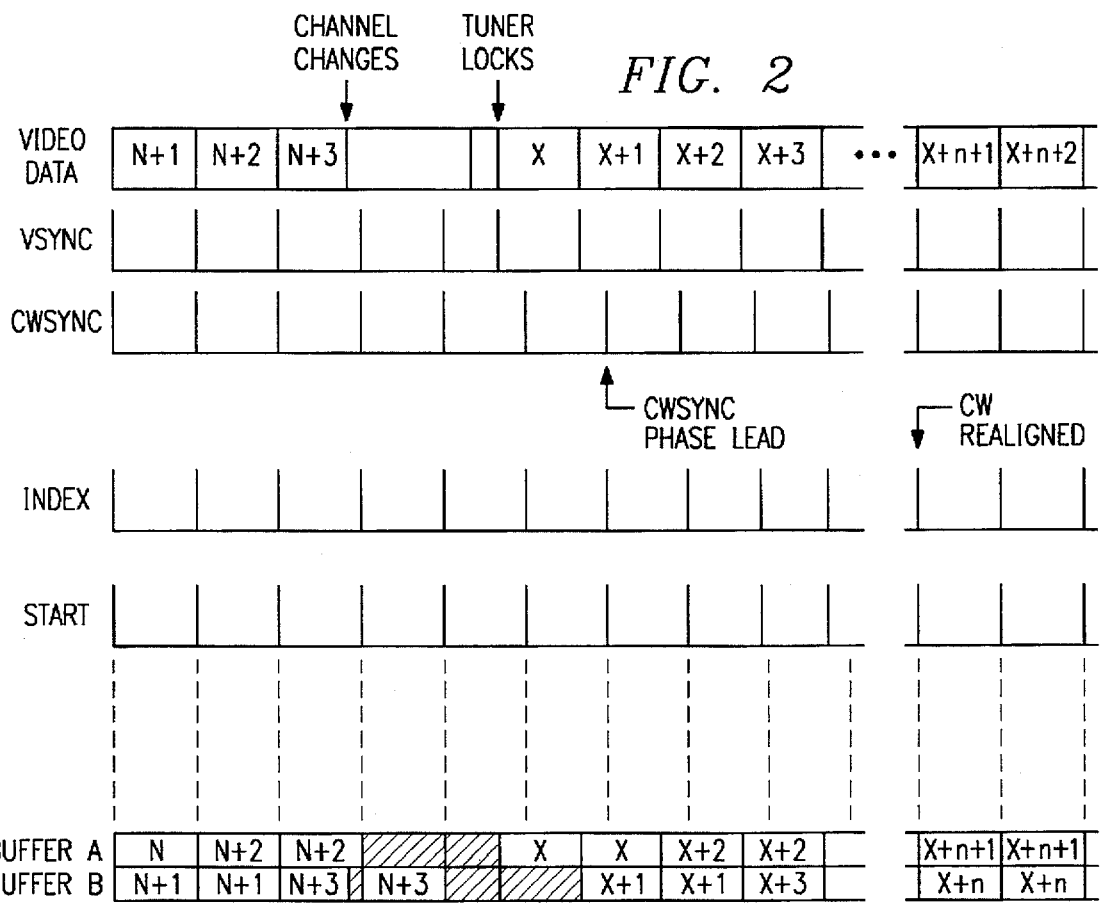
FIG. 2 is a timing chart of various signals involved in synchronization of the color wheel of FIG. 1 to incoming video data.

FIG. 2 is a timing chart of various signals involved in synchronization of color wheel 15 and incoming video data. As indicated, FIG. 2 includes a channel change, which results in an arbitrary phase change of the new video data with respect to the previous video data. Immediately after the channel change, there is a delay before the tuner locks to the new signal.

The "video data" line indicates the timing of fields of incoming data. In the example of this description, the incoming data has been sampled from a standard NTSC signal, and each incoming field (262.5 lines per field) has been converted to a frame of "DMD data" (525 lines per frame).

A vertical sync signal (VSYNC) separates the frames of data and has a frequency of 59.94 frames per second. In FIG. 2, VSYNC reflects a phase change after the channel change. The end of data for the previous channel arrived as Frames N+1 and N+2, and part of Frame N+3. After the channel change, the data for the new channel is arriving as Frames X, X+1, X+2, . . . . After n frames of data of the new channel have arrived, VSYNC and INDEX are re-synchronized.

Figure 3:
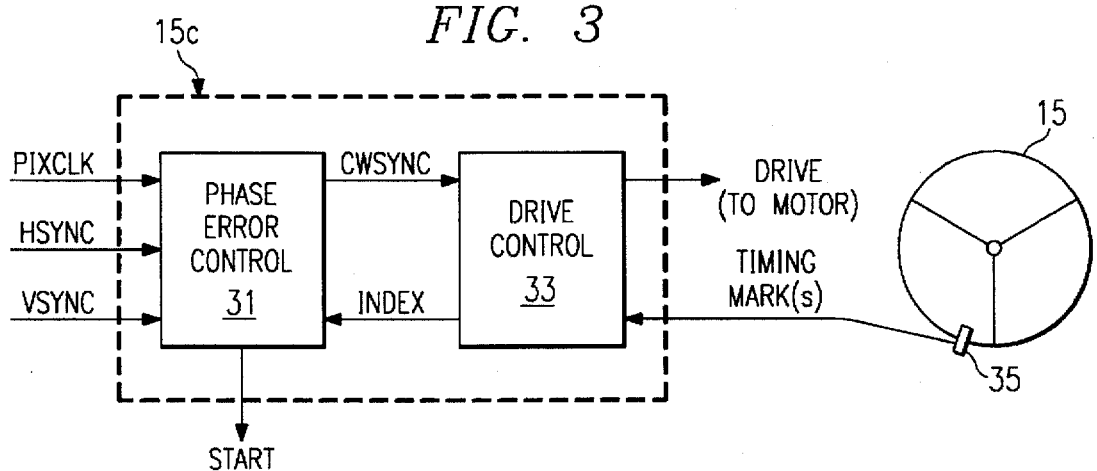
FIG. 3 illustrates the motor control unit of FIG. 1 in further detail.

FIG. 3 illustrates motor control unit 15c in further detail. Motor control unit 15c has two main components: an error control unit 31 and a drive control unit 33. As explained below, error control unit 31 controls a phase error and provides a color wheel sync signal (CWSYNC) to drive control unit 33. Drive control unit 33 phase locks an index signal (INDEX), which is provided by a position sensor 35 at color wheel 15, to the CWSYNC signal. The INDEX signal indicates the speed and phase of color wheel 15. In the example of this description, an INDEX pulse is generated once per revolution.

Figure 4:
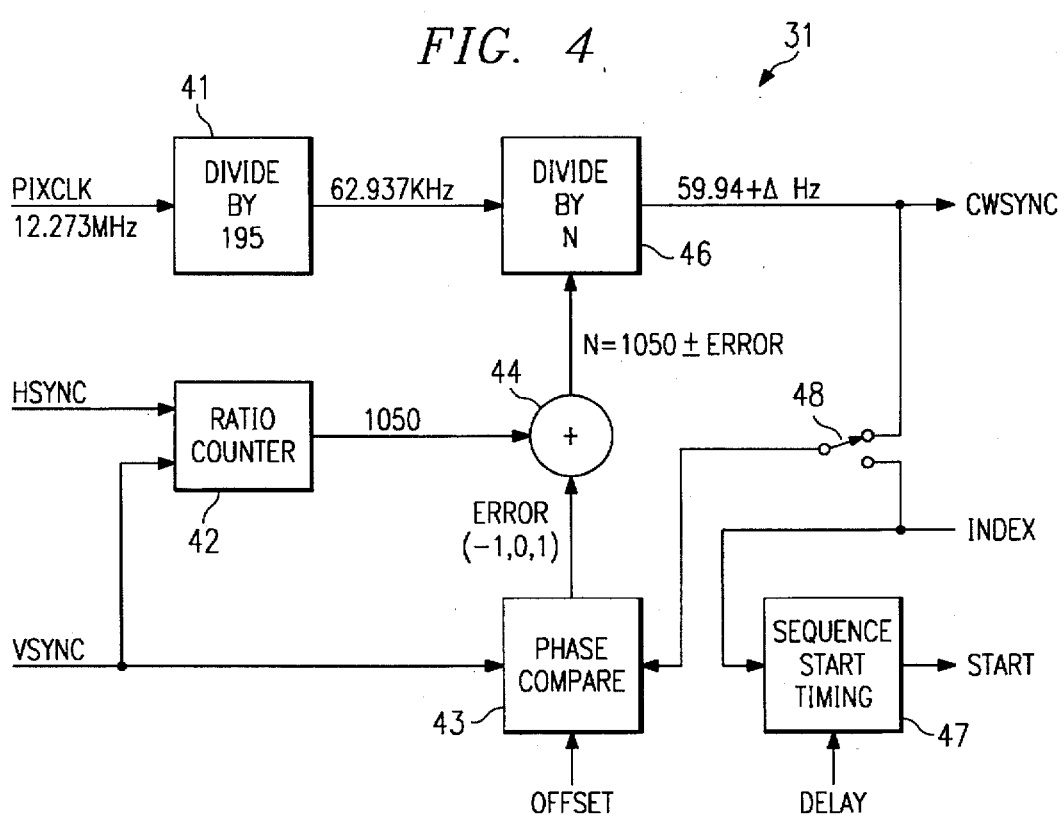
FIG. 4 illustrates the error control unit of FIG. 3 in further detail.

FIG. 4 illustrates error control unit 31 and its CWSYNC output in further detail. In general, the CWSYNC signal is a series of pulses derived by dividing down the pixel clock signal (PIXCLK) twice, with the second divider being adjusted by a phase error value. More specifically, a first divide-by-N counter 41 divides by a value derived from the number of pixels per line, to obtain a multiple of HSYNC. A second divide-by-N counter 46 divides by a multiple of the number of lines per frame plus or minus the phase error value. The result is CWSYNC, which has a period that is some increment larger or smaller than VSYNC.

In the example of this description, which is directed to NTSC data, the first divide-by-N counter 41 divides by 195, which is the number of pixels per line divided by 4 (780/4=195). The second divide-by-N counter 46 divides by the number of lines in two frames (2*525=1050) plus or minus the phase error value. Other embodiments are possible. For example, counter 41 might divide by 390 (780/2=390) and counter 46 would divide by the number of lines in one frame (525) plus or minus the phase error value. Or, counter 41 might divide by 780 and counter 46 would divide by the number of lines in one field (262.5) plus or minus the phase error value. These embodiments are considered equivalent, because each results in a signal derived from PIXCLK that is the same as VSYNC except as adjusted by the phase error.

Thus, in this example, ratio counter 42 counts the number of lines in two frames (2*525=1050). Ratio counter 42 allows for non-standard video, which may not have exactly 525 lines per frame as does NTSC video. If error control unit 31 were to be designed solely for NTSC video, ratio counter 42 could be omitted and adder 44 would simply add 1050 to the phase error value provided by phase comparator 43. The counting process is accomplished by counting HSYNC signals between VSYNC signals.

Divide-by-N counter 41 receives a PIXCLK signal, which is the sample clock for the video data and is phase locked to HSYNC. In the NTSC example of this description, PIXCLK is 780 times HSYNC, where 780 is the number of pixels per line. Counter 41 divides PIXCLK by 195, which is 780/4. The result is a 62.937 KHZ clock, which is 4 times the HSYNC rate of 15.734 KHZ.

Phase comparator 43 compares the phase of VSYNC to the phase of the INDEX signal from the color wheel 15, or alternatively, to the phase of CWSYNC. In the embodiment of FIG. 4, a switch 48 permits selection between CWSYNC and INDEX as inputs to phase comparator 43. However, in other embodiments, only one or the other of these two signals could be designated as the input.

If phase comparator 43 detects a phase error, a −1 or 1 value is generated, depending on whether the error is a lag or a lead error. If there is no phase error, a 0 value is generated. Adder 44 adds the phase error (−1, 0, or 1) to the output ratio counter 42. In alternative embodiments of the invention, the phase error value might also be +2 or −2 for larger phase errors. For a given phase error, this larger range of phase error values would provide faster re-synchronization. If desired, the phase of INDEX and VSYNC may be intentionally offset with an offset value, such as to allow for data loading delays.

Divide-by-N counter 46 divides the output of divide-by-N counter 41 by N, where N is the output of adder 44. The result is a CWSYNC signal, at 59.94+/−Δ Hz. Where there is no phase error, CWSYNC is the same rate as the VSYNC signal. If there is a phase error, CWSYNC is slightly faster or slower than VSYNC.

Referring again to FIG. 2, a slight lead of CWSYNC after the channel change is illustrated. During a channel change, the phase alignment between VSYNC and INDEX is disturbed. The resulting error modifies the period of CWSYNC. The response of motor drive unit 33 and motor 15a to the phase ramp input provided by CWSYNC is a constant speed increase, which causes INDEX to realign with VSYNC in a controlled manner. In other words, a small adjustment to the period of CWSYNC continues so as to "drag" the INDEX signal until it aligns with VSYNC. For a lag correction instead of a lead correction, the CWSYNC would cause the color wheel to slow down. In either case, for an NTSC signal, the worst case phase transient in CWSYNC due to a channel change is 31 microseconds (half of a line time).

FIGS. 2 and 4 also illustrates the effect of a VSYNC phase change on the displayed data. As illustrated in FIG. 4, a sequence start timer 47 generates a display start signal (START) from INDEX to control when data is loaded to SLM 14. Referring to FIG. 2, in the example of this description, START corresponds to INDEX, but a delay could be provided. At all times, the read buffers and write buffers of memory 13 are toggled in accordance with VSYNC. One buffer is read while the other is written. After a channel change, there is a period of noise during tuner lock, followed by a transition period during which START does not align with VSYNC. During the re-alignment time, START continues to load data into the SLM 14. As the buffers toggle from read to write, whichever buffer is currently being read is the buffer supplying the data for display. As a result, during the time that VSYNC does not correspond to INDEX, the proper colors, bit sequences, and pixel positions are maintained, but pixel data will come from temporally adjacent frames.

The above example is in terms of an NTSC signal, which has a VSYNC rate of 59.94 frames per second for interlaced data. The same concepts could be used for a VGA signal, which has a VSYNC rate of 60 frames per second, an HSYNC rate of 31.5 lines per second, 800 pixels per line, and a PIXCLK rate of 25.2 MHZ. For VGA, divider 41 would divide the number of pixels per line by 2 (800/2=400). Divider 46 would divide by the number of lines in two frames (1050) plus or minus the error value. No additional division by two is required to be made by divider 41 because HSYNC, at 31.5 KHZ, already reflects the correct number of lines per frame. The output of divider 41 would be a 63 KHZ signal (2×HSYNC), and the output of divider 46 would be a 60 +/−Δ Hz signal.

An enhancement of error control unit 31 would constrain the CWSYNC frequency to be close to 59.94 (for NTSC) to minimize recovery time. This can be done by fixing the most significant bits of the divide-by-N counter 46 to 010000 and letting adder 44 supply the six least significant bits. This constrains N to a range of 1024 to 1087 corresponding to a range of 61.52 Hz to 57.96 Hz.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of providing a color wheel sync signal for synchronizing a color wheel to an incoming video signal, where said video signal has been sampled with a pixel clock and converted from a series of interlaced fields to a series of frames separated in accordance with a vertical sync signal, and where said color wheel generates at least one index signal per revolution, comprising the steps of:

receiving an input signal that causes a potential phase difference between said vertical sync signal and one of said index signal and said color wheel sync signal;

comparing said one of said index signal and said color wheel sync signal said vertical sync signal; thereby providing a phase error value;

dividing said pixel clock by one-fourth the number of pixels per line, thereby providing a divided pixel clock signal;

adding said phase error value to the number of lines in two frames; and dividing said divided pixel clock signal by the result of said adding step, thereby providing said color wheel sync signal.

2. The method of claim 1, wherein said phase error value is −1, 0, or 1.

3. The method of claim 1, wherein said color wheel sync signal is constrained to a range of rates by fixing the most significant bits during said step of dividing said divided pixel clock signal.

4. A method of providing a color wheel sync signal for synchronizing a color wheel to an incoming video signal, where said video signal has been sampled with a pixel clock and consists of a series of frames separated in accordance with a vertical sync signal, and where said color wheel generates at least one index signal per revolution, comprising the steps of:

receiving an input signal that causes a potential phase difference between said vertical sync signal and one of said index signal and said color wheel sync signal;

comparing said one of said index signal and said color wheel sync signal to said vertical sync signal, thereby providing a phase error value;

dividing said pixel clock by one-half the number of pixels per line, thereby providing a divided pixel clock signal;

adding said phase error value to the number of lines in one frames; and dividing said divided pixel clock signal by the result of said adding step, thereby providing said color wheel sync signal.

5. A method of providing a color wheel sync signal for synchronizing a color wheel to an incoming video signal, where said video signal has been sampled with a pixel clock and consists of a series of frames separated in accordance with a vertical sync signal, and where said color wheel generates at least one index signal per revolution, comprising the steps of:

receiving an input signal that causes a potential phase difference between said vertical sync signal and one of said index signal and said color wheel sync signal;

comparing said one of index signal and said color wheel sync signal to said vertical sync signal, thereby providing a phase error value;

dividing said pixel clock by the number of pixels per line, thereby providing_a divided pixel clock signal;

adding said phase error value to the number of lines in one field; and dividing said divided pixel clock signal by the result of said adding step, thereby providing said color wheel sync signal.

6. The method of claim 4, wherein said phase error value is −1, 0, or 1.

7. The method of claim 4, wherein said color wheel sync signal is constrained to a range of rates by fixing the most significant bits during said step of dividing said divided pixel clock signal.

8. A phase error control unit for providing a color wheel sync signal for a color wheel in a display system that samples an incoming video signal with a pixel clock and converts the sampled signal from a series of interlaced fields to a series of frames separated in accordance with a vertical sync signal, and where said color wheel generates an index signal once per revolution, comprising:

an input signal that causes said incoming video signal to be switched such that a potential phase difference occurs between said vertical sync signal and one of said index signal and said color wheel sync signal;

a phase comparator for comparing one of said index signal and said color wheel sync signal to said vertical sync signal, thereby providing a phase error value;

an adder for receiving said phase error value from said phase comparator and for adding said phase error value to a value representing twice the number of lines per frame;

a first divide-by-N divider for dividing said pixel clock by one-fourth the number of pixels per line; and a second divide-by-N divider for dividing the output of said first divide-by-N counter by the output of said adder, thereby providing said color wheel sync signal.

9. The error control unit of claim 8, further comprising a ratio counter for counting said number of lines per frame for input to said adder.

10. A phase error control unit for providing a color wheel sync signal for a color wheel in a display system that samples an incoming video signal with a pixel clock to provide a series of frames separated in accordance with a vertical sync signal, and where said color wheel generates an index signal once per revolution, comprising:

an input signal that causes said incoming video signal to be switched such that a potential phase difference occurs between said vertical sync signal and one of said index signal and said color wheel sync signal;

a phase comparator for comparing one of said index signal and said color wheel sync signal to said vertical sync signal, thereby providing a phase error value;

an adder for receiving said phase error value from said phase comparator and for adding said phase error value to a value representing the number of lines per frame;

a first divide-by-N divider for dividing said pixel clock by one-half the number of pixels per line; and a second divide-by-N divider for dividing the output of said first divide-by-N counter by the output of said adder, thereby providing said color wheel sync signal.

11. The error control unit of claim 10, further comprising a ratio counter for counting said number of lines per frame for input to said adder.

* * * * *